(12) United States Patent
Yamashita et al.

(10) Patent No.: US 7,018,452 B2
(45) Date of Patent: Mar. 28, 2006

(54) INK SET FOR INK JET RECORDING, INK JET RECORDING METHOD AND INK JET RECORDING APPARATUS

(75) Inventors: Yoshiro Yamashita, Ebina (JP); Kyoko Horii, Hadano (JP); Nobuyuki Ichizawa, Minamiashigara (JP); Atsushi Suzuki, Minamiashigara (JP); Ken Hashimoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/863,397

(22) Filed: Jun. 9, 2004

(65) Prior Publication Data
US 2004/0254263 A1    Dec. 16, 2004

(30) Foreign Application Priority Data
Jun. 13, 2003    (JP) .............................. 2003-169338

(51) Int. Cl.
*C09D 11/02*    (2006.01)
*C03C 17/00*    (2006.01)

(52) U.S. Cl. .................. 106/31.27; 106/31.6; 523/160; 523/161

(58) Field of Classification Search ............. 106/31.27, 106/31.6; 523/160, 161
See application file for complete search history.

(56) References Cited

U.S. PATENT DOCUMENTS

| | | | |
|---|---|---|---|
| 5,181,045 A | 1/1993 | Shields et al. | |
| 5,198,023 A * | 3/1993 | Stoffel | 106/31.32 |
| 5,428,383 A | 6/1995 | Shields | |
| 5,488,402 A | 1/1996 | Shields et al. | |
| 5,518,534 A | 5/1996 | Pearlstine et al. | |
| 5,679,143 A | 10/1997 | Looman | |
| 5,730,790 A | 3/1998 | Rehman | |
| 5,997,623 A * | 12/1999 | Lin | 106/31.58 |
| 6,059,868 A * | 5/2000 | Kasperchik | 106/31.27 |
| 6,425,662 B1 * | 7/2002 | Teraoka et al. | 347/100 |
| 6,706,104 B1 * | 3/2004 | Takuhara et al. | 106/31.6 |

FOREIGN PATENT DOCUMENTS

| | | |
|---|---|---|
| JP | A-6-106735 | 4/1994 |
| JP | A-2002-212479 | 7/2002 |

* cited by examiner

*Primary Examiner*—J. A. Lorengo
*Assistant Examiner*—Veronica F. Faison
(74) *Attorney, Agent, or Firm*—Oliff & Berridge, PLC (57) ABSTRACT

An ink set for ink jet recording including plural color inks including a black ink, the ink set including water, a water-soluble organic solvent and colorants. At least one of the color inks having a hue other than black is a specified color ink containing a compound for coagulating a colorant contained in the black ink, at least one of other color inks has a function for improving coagulability between the colorant contained in the black ink and the compound contained in the specified color ink, and the drying time of the black ink on a plain paper sheet is less than 5 seconds.

17 Claims, 1 Drawing Sheet

FIG.1

INK SET FOR INK JET RECORDING, INK JET RECORDING METHOD AND INK JET RECORDING APPARATUS

CROSS-REFERENCE TO RELATED APPLICATION

This application claims priority under 35USC 119 from Japanese Patent Application No. 2003-169338, the disclosure of which is incorporated by reference herein.

BACKGROUND OF THE INVENTION

1. Field of the Invention

The present invention relates to an ink set for ink jet recording, an ink jet recording method and an ink jet recording apparatus.

2. Description of the Related Art

So called ink jet recording apparatuses for recording on a paper sheet, cloth or film by ejecting a liquid or molten solid ink from a nozzle, slit or porous film have been actively investigated considering the advantages of being compact, inexpensive and quiet. Many products capable of full color recording with a good quality of printing on a so-called plain paper sheet such as a copier paper sheet have been sold in the market, and have come to occupy a major position in the field of recording apparatuses.

Compatibility among various required properties has been investigated in the ink jet recording method. In particular, it is crucial that printing speed, quality of monochromatic images and mixed color images on a plain paper sheet, drying ability of the ink and storage stability of the image are compatible with each other while storage stability of the ink and reliability with respect to the ink jet head are satisfied. Since such properties can hardly be satisfied using one kind of ink, various methods have been devised (for example, see U.S. Pat. Nos. 5,428,383, 5,198,023, 5,518,534, 5,730,790, 5,181,045, 5,679,143 and 5,488,402, and Japanese Patent Application Laid-Open (JP-A) Nos. 6-106735 and 2002-212479). While these technologies have been developed for improving black color images and mixed color images using an ink set including a plurality of inks, it cannot be said that these inks have attained a sufficient quality level with respect to compatibility of other properties, particularly reliability with respect to the ink jet head.

Although intensive studies have been made on compatibility among printing speed, quality of monochromatic images and mixed color images on the plain paper sheet, drying ability of the ink, storage stability of the image and reliability with respect to the ink jet head, the ink jet inks cannot be considered to have attained a sufficient level for satisfying current technical requirements.

SUMMARY OF THE INVENTION

The present invention has been made in view of the above circumstances and provides an ink set for ink jet recording being excellent in printing speed, quality of monochromatic images and mixed color images on a plain paper sheet, drying ability of the ink and storage stability of the image as well as reliability with respect to the ink jet head, and an ink jet recording method and an ink jet recording apparatus using the ink set.

The problems as described above are solved by the following means.

A first aspect of the present invention is to provide an ink set for ink jet recording including plural color inks including a black ink, the ink set including water, a water-soluble organic solvent and colorant. At least one of the color inks having a hue other than black is a specified color ink containing a compound for coagulating a colorant contained in the black ink, at least one of other color inks has a function for improving coagulability between the colorant contained in the black ink and the compound contained in the specified color ink, and a drying time of the black ink on a plain paper sheet is less than 5 seconds.

A second aspect of the invention is to provide an ink jet recording method for forming an image by applying the ink set for ink jet recording according to the first aspect on a surface of a recording medium.

A third aspect of the invention is to provide an ink jet recording apparatus using the ink set for ink jet recording according to the first aspect, including a liquid-ejecting member for applying the ink set for ink jet recording according to the first aspect on a surface of a recording medium.

DETAILED DESCRIPTION OF THE INVENTION

Embodiments of the present invention will be described hereinafter. The construction of the ink jet ink set and ink jet recording method are also described in the descriptions below.

The ink set for ink jet recording of the invention has multicolor inks including a black ink. The ink set includes water, a water-soluble organic solvent and colorants as essential ingredients. At least one of color inks other than a black color ink is a specified color ink containing a compound for coagulating the colorant contained in the black ink (hereinafter, sometimes referred to as a colorant-coagulating agent). At least one of color inks other than the specified color ink has a function for improving coagulability between the colorant in the black ink and the compound in the specified color ink. The black ink has a drying time of less than 5 seconds on a plain paper sheet. The inventors of the invention found that quality of monochromatic images and mixed color images on a plain paper sheet, drying ability of the ink, storage stability of the image, storage stability of the ink and reliability with respect to the ink jet head can be achieved by printing an image using the ink set of the invention.

In an ink jet recording method for improving printing speed, the black ink and color inks are applied during the same scan. As another method, a black image is preferably formed using at least three kinds of inks: namely the black ink, the specified color ink containing a compound for coagulating a colorant in the black ink, and other color inks that do not contain a compound for coagulating the colorant in the black ink. It is also preferable to use both methods together. The effect of the invention becomes more remarkable by employing these ink jet recording methods.

Figure 1:
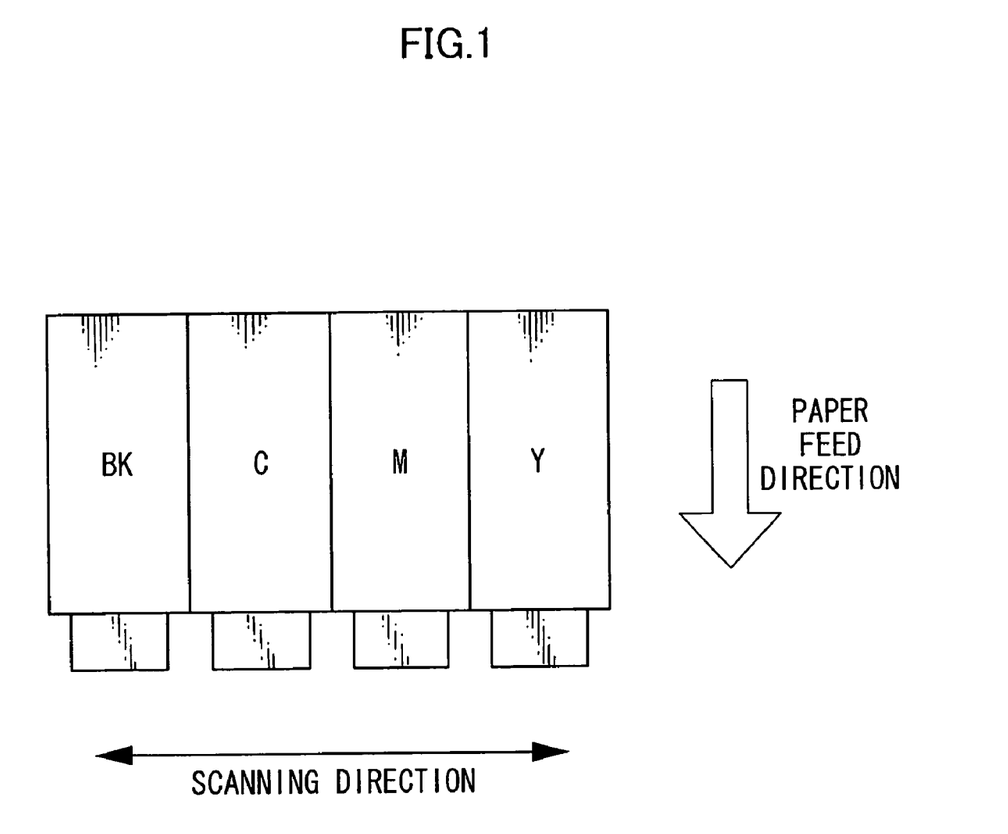
FIG. 1 is a schematic drawing showing an embodiment in the vicinity of the ink jet head of a recording apparatus using an ink jet recording method in which a black ink and color inks are applied during the same scan.

FIG. 1 is a schematic drawing showing an embodiment in the vicinity of the ink jet head of a recording apparatus using an ink jet recording method by which a black ink and color ink are printed during the same scan. As shown in the drawing, printing during the same scan is possible by synchronizing an ink jet head for ejecting the black ink with ink jet head for ejecting color inks.

The material for coagulating the colorant contained in the black ink used in the invention (colorant-coagulating agent) may be appropriately selected from known colorant-coagulating agents based on interaction with the colorant. While examples of the colorant-coagulating agent include multivalent metal salts, low molecular weight polyamines and salts thereof, amine polymers and ammonium salt polymers, the multivalent metal salts are preferable, and magnesium salts are preferable among them from the view point of an excellent coagulation effect and compatibility between storage stability of the color inks and reliability with respect to the ink jet head.

The black colorant is rapidly coagulated on the recording medium by using the colorant-coagulating agent together, and ink drying ability compatible with high speed printing could be attained by reducing the drying time of the black ink to be less than 5 seconds on a plain paper sheet.

When the ink set includes four colors of cyan (C), magenta (M), yellow and black (BK), for example, the compound for coagulating the colorant may be contained in at least one of C, M and Y color inks irrespective of the color of the ink. Alternatively, the black ink colorant-coagulating agent may be contained in two color inks of the C, M and Y color inks.

In other words, the ink having three functions of the black ink that contains the BK colorant, the specified color ink that contains the BK colorant-coagulating agent, and another color ink having a function for improving coagulability between the BK colorant and coagulating agent is essential in the invention. Accordingly, the specified color ink that contains the colorant-coagulating agent is required to be within the range of one to (X−1) colors when the BK color ink is combined with X (or X-kinds of) color inks.

At least one of other color inks that contain no colorant-coagulating agent should be selected so that the color ink has a property for improving coagulability by an interaction between the colorant and colorant-coagulating agent.

When the ink set includes five or more of color inks including light color inks, the colorant-coagulating agent for the black ink is preferably contained in the light color ink rather than in normal inks considering stability of the color inks.

The content of the colorant-coagulating agent is preferably 0.01 to 15% by mass, more preferably 0.1 to 10% by mass, and more desirably 0.3 to 7% by mass based on the amount of the specified color ink. Storage stability of the color inks and reliability with respect to the ink jet head tend to be decreased when the content of the colorant-coagulating agent is too large, while the image quality and drying ability become insufficient when the content of the colorant-coagulating agent is too small.

At least one color ink of other color inks containing no colorant-coagulating agent for the black ink is selected so that the ink has a function to readily induce coagulation between the colorant in the black ink and colorant-coagulating agent.

The method for improving coagulability between the BK colorant and colorant-coagulating agent usually includes, for example, adding an ionic surfactant in the color ink as a coagulation assistance, or controlling the pH of the color ink to be 5 or less. The method for controlling the pH of the color ink to be 5 or less is preferable, and the pH of the color ink is more preferably in the range of 3 to 5 considering stability of the color ink and reliability with respect to the ink jet head.

The method for controlling the pH of the ink within the preferable range above is not particularly restricted. A pH control agent selected by taking interaction with other components contained in the ink into consideration, for example acetic acid/alkali metal acetate, phthalic acid/metal phthalate, succinic acid/succinate and Good's buffer, may be added in an appropriate amount.

Preferably, the black ink contains a compound that reduces solubility and dispersability of the black colorant in addition to essential ingredients such as the colorant in order to further improve the quality of the monochromatic color image and mixed color image.

Adding the compound that reduces solubility and dispersability of the black ink colorant may permit coagulability of the colorant in contact with the colorant-coagulating agent to be further improved and enables the images to be quickly formed without blurring.

It is preferable to reduce solubility and dispersability of the colorant in the black ink by adding such a compound as compared with the system not containing such a compound. However, it is not preferable that the ink system becomes unstable to an extent that causes coagulation or precipitation of the colorant in the ink. Accordingly, the kind and amount of addition of the compound is appropriately selected depending on the ink system.

While examples of the compound that reduces solubility and dispersability of the BK colorant include alkali metal salts of organic acids and inorganic acids and polymer compounds, particularly water-soluble polymers, the water-soluble polymer is preferable considering reliability with respect to the ink jet head and fixability of images.

When the BK colorant is anionic, the water-soluble polymer compound added is preferably a nonionic polymer or an anionic polymer. The acid value of the polymer is preferably in the range of 50 to 300, more preferably 100 to 250, considering the image quality improving effect and solubility in the ink when the anionic polymer is used.

While the action of adding such compounds is not clear, dispersability of pigments may be controlled within an appropriate range by adding the water-soluble polymer probably because the water-soluble polymer interacts with hydrophilic functional groups on the surface of the pigment such as carbon black, and the polymer functions as a protective colloid on the surface of the pigment.

Specific examples of the water-soluble polymer used as the compound that reduces solubility and dispersability of the BK colorant of the invention include acrylic acid-acrylic ester copolymers, styrene-acrylate copolymers, styrene-acrylic acid-acrylic ester copolymers, styrene-maleic acid copolymers and styrene-maleic acid-maleic ester copolymers.

The amount of the water-soluble polymer added is preferably in the range of 3 to 50% by mass based on the amount of the BK colorant.

While either dyes or pigments may be used as the ink colorant in the invention, the pigment represented by carbon black is preferable as the BK colorant from the view point of storability of images. On the other hand, using the dyes is rather preferable in the color inks of other hues considering stability, coloring ability and light permeability of the ink.

The BK colorant will be described below. While carbon black is preferably used as the BK colorant as described above, self-dispersible carbon black is preferable considering stable dispersability since it is able to be dispersed in aqueous media without using any dispersant by allowing ionic groups to be bonded on the surface of the pigment. The effect of using such a colorant becomes remarkable particularly in the ink of the invention having a drying time of as short as less than 5 seconds on a plain paper sheet.

Self-dispersible carbon black preferably has at least one anionic group selected from —COOM, —SO$_3$M, —PO$_3$HM and —PO$_3$M$_2$ bonded on the surface of carbon black. Examples of commercially available materials that can be used in the invention include Cab-o-jet-200 and Cab-o-jet-300 (trade names: manufactured by Cabot Corporation), and Microjet Black CW-1 and CW-2 (trade names: manufactured by Orient Chemical Industries, Inc.).

The BK ink contains the BK colorant, water and an water-soluble organic solvent. While the ink is required to have a drying time of less than 5 seconds on the plain paper sheet, the drying time is more preferably in the range of 0.01 to 3 seconds. While the drying time of the ink on the plain paper is controllable by the kinds and amounts of the colorant and water-soluble organic solvent, the drying time is preferably controlled by the kinds and amounts of the surfactant and hydrophilic permeable solvents in the BK ink according to the invention.

The colorant of the color inks other than the BK color ink will be described below.

Known compounds such as acid dyes, direct dyes and dispersion dyes may be used as the dyes used for the colorant of the color inks other than the BK color ink.

Water-soluble anionic dyes having substituents selected from the group consisting of carboxylic acids and salts thereof and sulfonic acids and salts thereof as solubilizing groups are preferable among them considering stability and safety of the material.

Most of the water-soluble anionic dyes may be used irrespective of existing dyes and novel synthetic dyes so long as they have proper hues and color density. A mixture of a plurality of them may also be used.

Specific examples of the anionic dye include cyan dyes such as C.I direct blue-1, -2, -6, -8, -15, -22, -25, -34, -41, -70, -71, -76, -77, -78, -80, -86, -87, -90, -98, -106, -108, -112, -120, -142, -158, -163, -165, -168, -199, -200, -201, -287 and -307, C.I. acid blue-1, -7, -9, -15, -22, -23, -25, -27, -29, -40, -43, -55, -59, -62, -74, -78, -80, -81, -83, -90, -100, -102, -104, -111, -117, -127, -138, -158, -161, -185, -249 and -254; C.I. reactive blue-4, -5, 7-, -13, -14, -15, -18, -19, -21, -26, -27, -29, -32, -38, -40, -44 and -100; magenta dyes such as C.I. direct red-1, -2, -4, -8, -9, -11, -13, -15, -20, -23, -24, -28, -31, -33, -37, -39, -46, -51, -59, -62, -63, -73, -75, -9, -80, -81, -83, -87, -89, -90, -94, -95, -99, -101, -110, -189, -197, -201, -218, -220, -224, -225, -226, -227, -228, -229 and -230, C.I. direct violet-107, C.I. acid red-1, -4, -6, -8, -9, -13, -14, -15, -18, -21, -26, -27, -32, -35, -37, -42, -51, -52, -80, -83, -87, -89, -92, -106, -110, -114, -115, -133, -134, -144, -145, -158, -180, -198, -249, -257, -265 and -289, C.I reactive red-7, -12, -13, -15, -17, -20, -23, -24, -29, -31, -42, -45, -46 and -59, C.I. food red-87, -92 and 94, and M-377 (trade name: manufactured by ILFORD Co.); yellow dyes such as C.I. direct yellow-1, -2, -4, -8, -11, -12, -26, -27, -28, -33, -39, -34, -41, -44, -48, -50, -58, -85, -86, -87, -88, -89, -98, -100, -110, -132, -135, -142, -144 and -173, C.I. acid yellow-1, -3, -4, -7, -11, -12, -13, -14, -17, -18, -19, -23, -25, -29, -34, -36, -38, -40, -41, -42, -44, -53, -55, -61, -71, -76, -78, -79, -98, -99 and -122, C.I. reactive yellow-2, -3, -17, -25, -37 and -42, C.I. food yellow-3, and Y-104 and Y-1189 (trade names: manufactured by ILFORD Co.).

The dye set may be selected among the dyes described above considering stability against the colorant-coagulating agent, in particular, multivalent metal salts represented by Mg salts, hues and storage stability in a low pH region, and storage stability of the image quality.

The content of the colorant is preferably in the range of 0.1 to 20% by mass, more preferably 0.1 to 10% by mass, and more desirably 0.1 to 7% by mass based on the total amount of the ink from the view point of clog suppressing ability at the tip of the nozzle and color density of the image obtained.

The ink jet ink of the invention contains water and water-soluble solvents as essential ingredients in addition to the colorant.

While the water-soluble organic solvent is often used in the ink jet ink for preventing water from evaporating and for suppressing the ink from clogging, examples of the solvent usable in the invention include polyfunctional alcohols such as ethyleneglycol, diethyleneglycol, propyleneglycol, polyethyleneglycol, triethyleneglycol, glycerin, trimethylolpropane, 1,2,6-hexanetriol, 1,5-pentanediol, dipropyleneglycol, glycerin-oxyethylene adduct and diglycerin-oxyethylene adduct; sulfur-containing solvents such as thiodiethanol, 2-mercaptoethanol, thioglycerol, sulfolane and dimethylsulfoxide; nitrogen-containing solvents such as 2-pyrrolidone, N-methyl-2-pyrrolidone, cyclohexyl pyrrolidone, triethanolamine and diethanolamine; and glycol ethers such as ethyleneglycol monomethylether, ethyleneglycol monoethylether, ethyleneglycol monobuylether, diethyleneglycol monomethylether, diethyleneglycol monoethylether, diethyleneglycol monopropylether, diethyleneglycol monobutylether, diethyleneglycol monohexylether, trithyleneglycol monomethylether, trithyleneglycol monoethylether, trithyleneglycol monopropylether, trithyleneglycol monobutylether, trithyleneglycol monohexylether, propyleneglycol monomethylether, propyleneglycol monoethylether, propyleneglycol monopropylether, propyleneglycol monobutylether, dipropyleneglycol monomethylether, dipropyleneglycol monoethylether and dipropyleneglycol monopropylether.

While these solvents may be used alone or as a mixture of at least two of them, the content of the water-soluble organic solvent is preferably 1 to 60% by mass, more preferably 5 to 40% by mass, based on the amount of the ink, because the viscosity of the ink increases to cause deterioration of ejection stability and ejection response when the content of the water-soluble organic solvent is too large.

A surfactant may be added to the ink jet ink for controlling permeability into media and wettability on the ink jet head of the ink.

While any surfactants such as nonionic, anionic, cationic, and amphoteric surfactants may be used, the nonionic, anionic, and amphoteric surfactants are preferable considering storage stability since anionic colorants are frequently used.

Examples of the nonionic surfactant include polyoxyethylene alkylphenylether, polyoxyethylene alkylether, polyoxyethylene fatty acid ester, sorbitan fatty acid ester, polyoxyethylene sorbitan fatty acid ester, polyoxyethylene glycerin fatty acid ester, polyglycerin fatty acid ester, polyoxyethylene sorbit fatty acid ester, polyoxyethylene sterol, polyoxyethylene-polyoxypropylene ether, polyoxyethylene fatty acid amide, polyoxyethylene-polyoxypropylene block copolymer, nonionic acetyleneglycol surfactant, tetramethyldecinediol and tetramethyldecinediol-ethylene oxide adduct.

Examples of the anionic surfactant include alkylbenzene sulfonate, alkylphenyl sulfonate, alkylnaphthalene sulfonate, higher fatty acid salts, sulfate ester salts of higher fatty acid ester, sulfonate of higher fatty acid ester, sulfate ester salts and sulfonate of higher alcohol ether, higher alkyl sulfosuccinate, formalin condensate of naphthalenesulfonate, polystyrenesulfonate, polyacrylate, polyoxyethylene alkylether phosphate, alkylether carbonate, alkylsulfate, acrylic acid-acrylic ester copolymer, methacrylic acid-methacrylate ester copolymer, styrene-acrylic acid copolymer, styrene-acrylic acid-acrylic ester copolymer, styrene-methacrylic acid copolymer and styrene-methacrylic acid-methacrylate ester copolymer.

The amphoteric surfactant available include betaine, sulfobataine, sulfate betaine and imidazolin. Other examples of the amphoteric surfactant available include silicone surfactants such as polysiloxane-polyoxyethylene adduct, fluorine base surfactants such as perfluoroalkyl carbonate, perfluoroalkyl sulfonate and oxyethylene perfluoroalkylether, and bio-surfactants such as spicrispolic acid, rhamnolipid and lysolecithin.

These surfactants may be used alone, or as a combination of a plurality of them.

The surfactant is usually added to the ink in a proportion of 0.001 to 7% by mass, preferably in the range of 0.01 to 5% by mass.

Other additives usually used for the ink may also be used in the ink jet ink of the invention so long as they do not impair the effect of the invention.

Other additives used include pH control agents such as acids including hydrochloric acid, sulfuric acid, nitric acid, acetic acid, citric acid, succinic acid, malonic acid, boric acid, phosphoric acid, phosphorous acid, lactic acid, malic acid, phthalic acid and tartaric acid; bases including sodium hydroxide, potassium hydroxide, lithium hydroxide and ammonia; and buffering agents such as phosphate salts, oxalate salts, amine salts and Good's buffer.

The additives also include property adjusting agents such as polyethyleneimine, polyamines, polyvinylpyrrolidone, polyethyleneglycol and cellulose derivatives; clathrate compounds such as cyclodextrin, polycyclodextrine, macrocyclic amines and crown ethers; and solubilizing agents such as acetamide, betaine, urea and related compounds thereof. Antifungal agents, rust preventives, bactericides, chelating agents and dendrimers may also be added, if necessary.

Printing speed, image quality of monochromatic images and mixed color images on a plain paper sheet, drying ability of the ink, stable image storability and reliability with respect to the ink jet head are compatible with each other in the ink set for ink jet printing including water, water soluble organic solvents and colorants as essential ingredients, when the ink set used includes at lest one color ink of the color inks that contains the material for coagulating the colorant in the black ink, and other color inks having a function for facilitating coagulation between the colorant in the black ink and the color inks, and when the drying time of the black ink on the plain paper sheet is less than 5 seconds.

The ink jet recording apparatus of the invention includes a liquid-ejecting member for applying the ink set for ink jet recording on the surface of the recording medium.

The liquid-ejecting member preferably includes an ink jet head utilizing a thermal ink jet method or a piezo ink jet method. It is also preferable for improving the printing speed to provide a liquid-ejecting member capable of printing the black ink and at least one of color inks on the recording medium during the same scan.

Embodiments of the invention will be described hereinafter.

A first embodiment of the present invention provides an ink set for ink jet recording including a plurality of color inks including a black ink, the ink set including water, a water-soluble organic solvent and colorant. At least one of the color inks having a hue other than black is a specified color ink containing a compound for coagulating a colorant contained in the black ink, at least one of other color inks has a function for improving coagulability between the colorant contained in the black ink and the compound contained in the specified color ink, and a drying time of the black ink on a plain paper sheet is less than 5 seconds.

A second embodiment of the invention provides the ink set for ink jet recording according to the first embodiment of the invention, wherein the compound for coagulating the colorant of the black ink contained in the specified color ink is a multivalent metal salt.

A third embodiment of the invention provides the ink set for ink jet recording according to the second embodiment of the invention, wherein the multivalent metal salt is a magnesium salt.

A fourth embodiment of the invention provides the ink set for ink jet recording according to any one of the first to third embodiments of the invention, wherein at least one of other color inks containing no compounds for coagulating the colorant in the black ink has a pH of 5 or less.

A fifth embodiment of the invention provides the ink set for ink jet recording according to any one of the first to fourth embodiments of the invention, wherein the colorant contained in the black ink is carbon black.

A sixth embodiment of the invention provides the ink set for ink jet recording according to the fifth embodiment of the invention, wherein the carbon black is self-dispersible carbon black.

A seventh embodiment of the invention provides the ink set for ink jet recording according to any one of the first to sixth embodiments of the invention, wherein the colorants contained in the specified color ink and other color inks are dyes.

An eighth embodiment of the invention provides the ink set for ink jet recording according to any one of the first to seventh embodiments of the invention, wherein the black ink contains a compound for reducing solubility and dispersibility of the colorant contained in the black ink.

A ninth embodiment of the invention provides the ink set for ink jet recording according to the eighth embodiment of the invention, wherein the compound for reducing solubility and dispersibility of the colorant contained in the black ink is a polymer compound.

A tenth embodiment of the invention provides the ink set for ink jet recording according to the ninth embodiment of the invention, wherein the polymer compound is a nonionic or an anionic water-soluble polymer.

An eleventh embodiment of the invention provides the ink set for ink jet recording according to the ninth embodiment of the invention, wherein the polymer compound is an anionic water-soluble polymer having an acid value of 50 to 300.

A twelfth embodiment of the invention provides an ink jet recording method for forming an image by applying the ink set for ink jet recording according to any one of the first to eleventh embodiments of the invention on a surface of a recording medium.

A thirteenth embodiment of the invention provides the ink jet recording method according to twelfth embodiment of the invention, wherein the black ink and at least one of the color inks are applied on the recording medium during the same scan when the ink set is applied on the surface of the recording medium.

A fourteenth embodiment of the invention provides the ink jet recording method according to the twelfth or thirteenth embodiment of the invention, wherein a black image is formed using three inks including the black ink, the specified color ink containing the compound for coagulating the colorant contained in the black ink, and at least one color ink other than the specified color ink.

A fifteenth embodiment of the invention provides an ink jet recording apparatus using the ink set for ink jet recording according to any one of the first to eleventh embodiments of the invention, including a liquid-ejecting member for applying the ink set for ink jet recording according to any one of the first to eleventh embodiments on a surface of a recording medium.

A sixteenth embodiment of the invention provides the ink jet recording apparatus according to the fifteenth embodiment of the invention, wherein the liquid-ejecting member is an ink jet head utilizing a thermal ink jet method or piezo ink jet method.

A seventeenth embodiment of the invention provides the ink jet recording apparatus according to the fifteenth or sixteenth embodiment of the invention, wherein the liquid-ejecting member is constructed so that the black ink and at least one of the color inks can be applied on the recording medium during the same scan.

EXAMPLES

The present invention will be described hereinafter with reference to examples. However, the examples should not be construed to limit the scope of the invention. "Parts" in the examples stand for "parts by weight".

Example 1

A printer including a black ink recording head, cyan ink recording head, magenta ink recording head and yellow ink recording head each having a resolution of 800 dpi are produced for experiment.

Preparation of Inks

| [Black ink] | |
|---|---|
| Cab-o-jet 300 (pigment dispersion solution) | 40 parts |
| Glycerin | 10 parts |
| Diethyleneglycol | 10 parts |
| Acetyleneglycol-polyoxyethylene adduct | 1.0 part |
| Styrene-acrylic acid copolymer (pigment solubility and dispersability adjusting agent) | 0.2 parts |
| Pure water | 38.8 parts |

After thoroughly mixing the components above, the solution is filtered by pressurizing using a 2 μm filter to prepare the black ink.

| [Cyan ink] | |
|---|---|
| C.I. direct blue 199 | 4 parts |
| Ethyleneglycol | 5 parts |
| 2-pyrrolidone | 5 parts |
| Glycerin | 5 parts |
| Butyl carbitol | 3 parts |
| Triethyleneglycol monobutylether | 5 parts |
| Magnesium nitrate hexahydrate (BK colorant-coagulating agent) | 5 parts |
| BES (pH control agent: N,N-bis-(2-hydroxyethyl)-2-aminoethane sulfonic acid) | 0.5 parts |
| NaOH | 0.04 parts |
| Pure water | 67.46 parts |

After thoroughly mixing the components above, the solution is filtered by pressurizing using a 0.45 μm filter to prepare the cyan ink.

| [Magenta ink] | |
|---|---|
| C.I. direct red 75 | 3.5 parts |
| Diethyleneglycol | 15 parts |
| Sulfolane | 5 parts |
| Butyl carbitol | 6 parts |
| Acetic acid | 2 parts |
| NaOH | 0.7 parts |
| Pure water | 67.8 parts |

After thoroughly mixing the components above, the solution is filtered by pressurizing using a 0.45 μm filter to prepare the magenta ink.

| [Yellow ink] | |
|---|---|
| C.I. direct yellow 144 | 2.5 parts |
| Glycerin | 7 parts |
| 2-pyrrolidone | 8 parts |
| Surfynol 465 (trade name: manufactured by Air Products Co., acetyleneglycol-oxyethylene adduct, nonionic surfactant) | 1.0 parts |
| Phthalic acid | 1.5 parts |
| NaOH | 0.4 parts |
| Pure water | 79.6 parts |

After thoroughly mixing the components above, the solution is filtered by pressurizing using a 0.45 μm filter to prepare the yellow ink.

Comparative Example 1

Preparation of Ink

| [Black ink] | |
|---|---|
| Cab-o-jet 300 (Pigment dispersion solution) | 40 parts |
| Glycerin | 10 parts |
| Diethyleneglycol | 10 parts |
| Acetyleneglycol-polyoxyethylene adduct | 1.0 part |
| Pure water | 39.0 parts |

After thoroughly mixing the components above, the solution is filtered by pressurizing using a 2 μm filter to prepare the black ink.

| [Cyan ink] | |
|---|---|
| C.I. direct blue 199 | 4 parts |
| Ethyleneglycol | 5 parts |
| 2-pyrrolidone | 5 parts |
| Glycerin | 5 parts |
| Butyl carbitol | 3 parts |
| Triethyleneglycol monobutylether | 5 parts |
| Magnesium sulfate hexahydrate (BK colorant-coagulating agent) | 5 parts |
| BES (pH control agent: N,N-bis(2-hydroxyethyl)-2-aminoethane sulfonic acid) | 0.5 parts |
| NaOH | 0.04 parts |
| Pure water | 67.46 parts |

After thoroughly mixing the components above, the solution is filtered by pressurizing using a 0.45 μm filter to prepare the cyan ink.

| [Magenta ink] | |
|---|---|
| C.I. direct red 75 | 3.5 parts |
| Diethyleneglycol | 15 parts |
| Sulfolane | 5 parts |
| Butyl carbitol | 6 parts |
| Magnesium nitrate hexahydrate (BK colorant coagulant) | 5 parts |
| BES (pH control agent: N,N-bis(2-hydroxyethyl)-2-aminoethane sulfonic acid) | 0.5 parts |
| NaOH | 0.04 parts |
| Pure water | 64.96 parts |

Preparation of the magenta ink is not possible since precipitates appear after thoroughly mixing the components.

| [Yellow ink] | |
|---|---|
| C.I. direct yellow 144 | 2.5 parts |
| Glycerin | 7 parts |
| 2-pyrrolidone | 8 parts |
| Surfynol 465 | 1.0 parts |
| Magnesium nitrate hexahydrate (BK colorant coagulant) | 5 parts |
| BES (pH control agent: N,N-bis(2-hydroxyethyl)-2-aminoethane sulfonic acid) | 0.5 parts |
| NaOH | 0.04 parts |
| Pure water | 75.6 parts |

Preparation of the yellow ink is not possible since precipitates appears after thoroughly mixing the components.

Comparative Example 2

Preparation of the Ink

| [Black ink] | |
|---|---|
| Cab-o-jet 300 (pigment dispersion solution) | 40 parts |
| Glycerin | 10 parts |
| Diethylene glycol | 10 parts |
| Butyl carbitol | 5 parts |
| Pure water | 35 parts |

After thoroughly mixing the components above, the solution is filtered by pressurizing using a 2 μm filter to prepare the black ink.

| [Cyan ink] | |
|---|---|
| C.I. direct blue 199 | 4 parts |
| Ethyleneglycol | 5 parts |
| 2-pyrrolidone | 5 parts |
| Glycerin | 5 parts |
| Butyl carbitol | 3 parts |
| Triethyleneglycol monobutylether | 5 parts |
| Hydrochloric acid | 0.5 parts |
| Pure water | 72.5 parts |

After thoroughly mixing the components above, the solution is filtered by pressurizing using a 0.45 μm filter to prepare the cyan ink.

| [Magenta ink] | |
|---|---|
| C.I. direct red 75 | 3.5 parts |
| Diethyleneglycol | 15 parts |
| Sulfolane | 5 parts |
| Butyl carbitol | 6 parts |
| Hydrochloric acid | 0.5 parts |
| Pure water | 64.96 parts |

After thoroughly mixing the components above, the solution is filtered by pressurizing using a 0.45 μm filter to prepare the magenta ink.

| [Yellow ink] | |
|---|---|
| C.I. direct yellow 144 | 2.5 parts |
| Glycerin | 7 parts |
| 2-pyrrolidone | 8 parts |
| Surfynol 465 | 1.0 parts |
| Hydrochloric acid | 0.5 parts |
| Pure water | 81 parts |

After thoroughly mixing the components above, the solution is filtered by pressurizing using a 0.45 μm filter to prepare the yellow ink.

Evaluation (1) pH of the Ink

The pH of the ink is measured at 23° C. and 55% RH using a pH meter manufactured by Orion Co.

(2) Image Quality Test

The quality of monochromatic black letters and the quality of black line patterns on a color background are evaluated by printing them on a P paper sheet (trade name: manufactured by Fuji Xerox Co., Ltd.). The black line is formed by overlapping printing of the black (BK), cyan (C), magenta (M) and yellow (Y) inks. The proportion of BK/C/M/Y is 20:2:1:1.

The image quality is evaluated with respect to the image quality of the monochromatic BK letters and blurring of 2- to 8-dot black lines on the color background using the following criteria.

(a) Image Quality of Monochromatic BK Letters

A: all letters are clearly printed

B: some of small letters are difficult to read

C: complex letters with a size of 4 points or less are fuzzy and difficult to read.

(b) Blurring of Black 1-Dot Line on Color Background

A: no blurring

B: slight blurring

C: whisker-like blurring at many portions (3) Ink Drying Ability Test

BK solid images are printed on an FX-P paper sheet (trade name: manufactured by Fuji Xerox Co., Ltd.) as a representative plain paper sheet at 23° C. and 55% RH using a test head with a resolution of 800 dpi, and the time required after printing for ink droplets to disappear from the paper sheet under visual inspection is measured.

(4) Image Storage Stability Test (a) Evaluation of Water Resistance

About 1 ml of water is dripped on a print sample sheet 24 hours after printing, water drops are allowed to flow down by quickly tilting the sample after such dripping, and the sample sheet is allowed to naturally dry. Image-blurring after adhesion is evaluated.

A: no blurring
B: slightly stained
C: so severely stained that discrimination of the image is not possible (b) Evaluation of Light Fastness Light is irradiated onto solid images with an optical density (O.D.) of about 1.0 on a plain paper sample sheet, after at least 24 hours from printing, using an HPUV light fastness tester (a fluorescent lamp light fastness tester). An indoor light fastness lifetime is estimated and evaluated by the following criteria.

A: estimated lifetime . . . 15 years or more
B: estimated lifetime . . . 5 to 15 years
C: estimated lifetime . . . less than 5 years (5) Ink Jet Head Reliability Test (a) Ink Jet Head Service Life Test The ink is continuously ejected for $2 \times 10^8$ pulses using a test head with a resolution of 800 dpi, and changes in the ejection state of the ink are evaluated.

A: the change in O.D. of half-tone images is 20% or less relative to the original level
B: the change in O.D. of half-tone images is 40% or less relative to the original level
C: ejection becomes impossible in some of the ink jet nozzles The results of evaluation are shown in Table 1 below.

coagulating agent is added, and the quality of the black image is insufficient.

Example 2

Preparation of Ink

[Black Ink]

The same black ink as in Example 1 is prepared.

| [Cyan ink] | |
|---|---|
| C.I. acid blue 249 | 3 parts |
| Diethyleneglycol | 10 parts |
| Glycerin-EO adduct | 3 parts |
| Butyl carbitol | 6 parts |
| Magnesium nitrate hexahydrate (BK colorant-coagulating agent) | 5 parts |
| BES (pH control agent: N,N-bis(2-hydroxyethyl)-2-aminoethane sulfonic acid) | 0.5 parts |
| NaOH | 0.04 parts |
| Pure water | 72.46 parts |

After thoroughly mixing the components above, the solution is filtered by pressurizing using a 0.45 μm filter to prepare the cyan ink.

TABLE 1

| | Example 1 | | | | Comparative Example 1 | | | | Comparative Example 2 | | | |
|---|---|---|---|---|---|---|---|---|---|---|---|---|
| | Black | Cyan | Magenta | Yellow | Black | Cyan | Magenta | Yellow | Black | Cyan | Magenta | Yellow |
| Ink pH | 8.1 | 7.1 | 4.0 | 4.3 | 8.0 | 7.1 | — (Preparation of ink is not possible) | — (Preparation of ink is not possible) | 8.0 | 3.9 | 3.8 | 3.7 |
| Image Quality Test | | | | | | | | | | | | |
| (a) Quality of Monochromatic Black Letter | A | — | — | — | — | — | — | — | A | — | — | — |
| (b) Blurring of Black 1-Dot Line on Color Background | | A | | | | — | | | | C | | |
| Drying Time Test (s) | 1 | — | — | — | — | — | — | — | 1 | — | — | — |
| Image Storage Stability Test | | | | | | | | | | | | |
| (a) Water resistance | A | A | A | A | A | A | — | — | A | A | A | A |
| (b) Light fastness | A | A | A | A | A | A | — | — | A | A | A | A |
| Ink-Jet Head Reliability Test | A | A | A | A | A | A | — | — | A | A | A | A |

Table 1 shows that no blurring is observed in either the black or color images with good image quality of both monochromatic and mixed color images on a plain paper sheet, and drying ability of the ink, image storage stability and reliability with respect to the ink jet head are excellent in Example 1 with respect to the ink set of the invention. On the other hand, preparation of the ink is not possible in the ink set in Comparative Example 1 in which the colorant-coagulating agent is added in all the color inks other than the BK ink, due to precipitation, and the pH of the color inks other than the BK ink is low. Black images are blurred in the ink set in Comparative Example 2 in which no colorant-

| [Magenta ink] | |
|---|---|
| M-377 (trade name: manufactured by ILFORD Co.) | 3.5 parts |
| Ethyleneglycol | 10 parts |
| Glycerin | 5 parts |
| Butyl carbitol | 6 parts |
| Phthalic acid | 1.5 parts |
| NaOH | 0.4 parts |
| Pure water | 73.6 parts |

After thoroughly mixing the components above, the solution is filtered by pressurizing using a 0.45 μm filter to prepare the magenta ink.

[Yellow ink]

| | |
|---|---|
| C.I. acid yellow 23 | 3 parts |
| Propyleneglycol | 5 parts |
| Triethyleneglycol | 10 parts |
| Surfynol 465 (trade name: manufactured by Air Products Co., acetyleneglycol-oxyethylene adduct, nonionic surfactant) | 2.5 parts |
| Magnesium nitrate hexahydrate (BK colorant coagulant) | 2 parts |
| Pure water | 77.5 parts |

After thoroughly mixing the components above, the solution is filtered by pressurizing using a 0.45 μm filter to prepare the yellow ink.

The inks in Example 2 are evaluated in the same manner as in Example 1. The results are shown in Table 2 below.

Comparative Example 3

Preparation of Ink

[Black Ink]

The same black ink as in Example 1 is prepared.

[Cyan ink]

| | |
|---|---|
| C.I. acid blue 9 | 3 parts |
| Diethyleneglycol | 10 parts |
| Glycerin-EO adduct | 3 parts |
| Butyl carbitol | 6 parts |
| Magnesium nitrate hexahydrate (BK colorant coagulant) | 5 parts |
| BES (pH control agent: N.N-bis(2-hydroxyethyl)-2-aminoethane sulfonic acid) | 0.5 parts |
| NaOH | 0.04 parts |
| Pure water | 72.46 parts |

After thoroughly mixing the components above, the solution is filtered by pressurizing using a 0.45 μm filter to prepare the cyan ink.

[Magenta ink]

| | |
|---|---|
| C.I. direct red 227 | 3.5 parts |
| Ethyleneglycol | 10 parts |
| Glycerin | 5 parts |
| Butyl carbitol | 5 parts |
| Pure water | 76.5 parts |

After thoroughly mixing the components above, the solution is filtered by pressurizing using a 0.45 μm filter to prepare the magenta ink.

[Yellow ink]

| | |
|---|---|
| C.I. direct yellow 144 | 3 parts |
| Propyleneglycol | 10 parts |
| Triethyleneglycol | 10 parts |
| Surfynol 465 (trade name: manufactured by Air Products Co., acetyleneglycol-oxyethylene adduct, nonionic surfactant) | 2 parts |
| Pure water | 75 parts |

After thoroughly mixing the components above, the solution is filtered by pressurizing using a 0.45 μm filter to prepare the yellow ink.

The inks in Comparative Example 3 are evaluated in the same manner as in Example 1. The results are shown in Table 2 below.

TABLE 2

| | Example 2 | | | | Comparative Example 3 | | | |
|---|---|---|---|---|---|---|---|---|
| | Black | Cyan | Magenta | Yellow | Black | Cyan | Magenta | Yellow |
| Ink pH | 8.1 | 7.1 | 3.9 | 6.9 | 8.1 | 7.1 | 7.0 | 7.1 |
| Image Quality Test | | | | | | | | |
| (a) Quality of Monochromatic BK Letter | A | — | — | — | — | — | — | — |
| (b) Blurring of Black 1-Dot Line on Color Background | | A | | | | C | | |
| Drying Time Test (s) | 1 | — | — | — | 1 | — | — | — |
| Image Storage stability Test | | | | | | | | |
| (a) Water resistance | A | A | A | B | A | C | B | A |
| (b) Light fastness | A | A | A | B | A | C | B | A |
| Ink-Jet Head Reliability Test | A | A | A | A | A | A | A | A |

Table 2 shows that no blurring is observed in either the black or color images with good image quality of both monochromatic and mixed color images on a plain paper sheet, and drying ability of the ink, image storage stability and reliability with respect to the ink jet head are excellent in Example 2 with respect to the ink set of the invention.

On the other hand, it has been found that the black image is blurred with an insufficient black image quality in the ink set in Comparative Example 3 in which the colorant-coagulating agent is contained in one of other color inks other than the BL ink, and pH of other color inks is in the range of neutral to basic.

As hitherto described, the invention provides an ink set for ink jet printing satisfying printing speed, image quality of monochromatic images and color images on a plain paper sheet, ink drying ability and image storage stability while being excellent in ink storage stability and reliability with respect to the ink jet head. The invention also provides an ink jet recording method and on ink jet recording apparatus in which printing speed, image quality on a plain paper sheet, ink drying ability, image storage stability, ink storage stability and reliability with respect to the ink jet head are all excellent due to using the ink set for ink jet recording according to the invention.

What is claimed is:

1. An ink set for ink jet recording comprising a plurality of color inks including a black ink, the ink set comprising water, a water-soluble organic solvent and colorant, wherein:
    at least one of the color inks having a hue other than black is a specified color ink containing a compound for coagulating a colorant contained in the black ink,
    at least one of other color inks has a function for improving coagulability between the colorant contained in the black ink and the compound contained in the specified color ink, and
    a drying time of the black ink on a plain paper sheet is less than 5 seconds, and
    wherein the at least one of other color inks contains no compounds for coagulating the colorant in the black ink.

2. The ink set for ink jet recording of claim 1, wherein the compound for coagulating the colorant of the black ink contained in the specified color ink is a multivalent metal salt.

3. The ink set for ink jet recording of claim 2, wherein the multivalent metal salt is a magnesium salt.

4. The ink set for ink jet recording of claim 1, wherein the at least one of other color inks containing no compounds for coagulating the colorant in the black ink has a pH of 5 or less.

5. The ink set for ink jet recording of claim 1, wherein the colorant contained in the black ink is carbon black.

6. The ink set for ink jet recording of claim 5, wherein the carbon black is self-dispersible carbon black.

7. The ink set for ink jet recording of claim 1, wherein the colorants contained in the specified color ink and other color inks are dyes.

8. The ink set for ink jet recording of claim 1, wherein the black ink contains a compound for reducing solubility and dispersibility of the colorant contained in the black ink.

9. The ink set for ink jet recording of claim 8, wherein the compound for reducing solubility and dispersibility of the colorant contained in the black ink is a polymer compound.

10. The ink set for ink jet recording of claim 9, wherein the polymer compound is a nonionic or an anionic water-soluble polymer.

11. The ink set for ink jet recording of claim 9, wherein the polymer compound is an anionic water-soluble polymer having an acid value of 50 to 300.

12. An ink jet recording method for forming an image by applying the ink set for ink jet recording of claim 1 on a surface of a recording medium.

13. The ink jet recording method of claim 12, wherein the black ink and at least one of the color inks are applied on the recording medium during the same scan when the ink set is applied on the surface of the recording medium.

14. The ink jet recording method of claim 12, wherein a black image is formed using three inks comprising the black ink, the specified color ink containing the compound for coagulating the colorant contained in the black ink, and at least one color ink other than the specified color ink.

15. An ink jet recording apparatus using the ink set for ink jet recording of claim 1, comprising a liquid-ejecting member for applying the ink set for ink jet recording of claim 1 on a surface of a recording medium.

16. The ink jet recording apparatus of claim 15, wherein the liquid-ejecting member is an ink jet head utilizing a thermal ink jet method or piezo ink jet method.

17. The ink jet recording apparatus of claim 15, wherein the liquid-ejecting member is constructed so that the black ink and at least one of the color inks can be applied on the recording medium during the same scan.

* * * * *